UNITED STATES PATENT OFFICE.

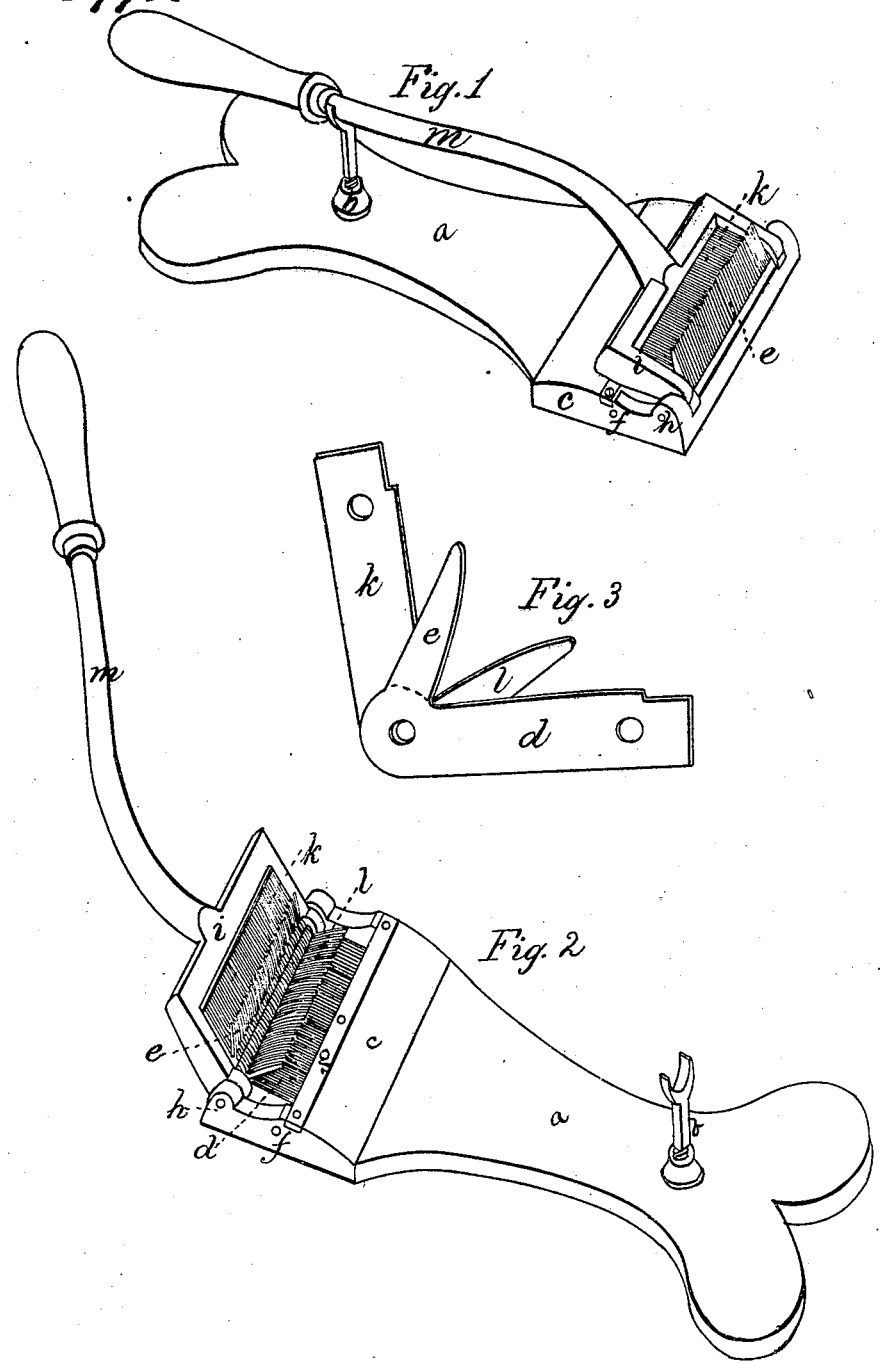

PETER PEUGEOT AND GEO. PEUGEOT, OF BUFFALO, NEW YORK.

MACHINE FOR CUTTING PAPER FRINGE.

Specification of Letters Patent No. 5,972, dated December 19, 1848.

*To all whom it may concern:*

Be it known that we, PETER PEUGEOT and GEORGE PEUGEOT, of the city of Buffalo, in the county of Erie and State of New York, have invented a new and useful Improvement in the machine known as and denominated a Motto-Cutter, used by confectioners to cut fringed edges in paper; and we do hereby declare that the following is a full, clear, and exact description of the construction and operation of the same, reference being had to the annexed drawings, making a part of this specification, in which—

Figure 1 is a perspective view of the machine when shut. Fig. 2 a perspective view of the machine when open. Fig. 3 shows two of the blades or teeth (full size) in their relative position to each other when the machine is open.

N. B. The dotted line exhibits the form of the blades in the original machine; our improvement consisting solely in forming the blades with the additional portions ($e, l$) which we denominate clearing teeth; ($a$) platform; ($b$) rest; ($c$) lower frame; ($d$) teeth or blades in the same; ($e$) clearing teeth; ($f$) bolt; ($g$) plate; ($h$) pivot; ($i$) upper frame; ($k$) teeth or blades in the same; ($l$) clearing teeth; ($m$) lever or handle.

In the lower frame ($c$) which forms part of the platform ($a$) a series of blades ($d$) is inserted, their front ends being retained in their place by the bolt ($f$) passing through them and fixed in the sides of ($c$) and plate ($g$) lying over them and screwed to ($c$). In the upper frame ($i$) another series of blades ($k$) is placed to alternate with blades ($d$) on the pivot ($h$). This pivot is fixed at the rear end in the sides of lower frame and the upper frame with its contained series of blades revolves upon it. The handle ($m$) is attached to and forms part of upper frame.

The machine being so far open as to leave the clearing teeth behind the edges of the blades; the paper is placed between the blades, and the upper frame being fetched down by the handle the upper and lower blades operating as a combined series of shears, cut the edge of the paper into fringe, the projection of the clearing teeth freeing the blades from the paper.

As it has ever been an objection to the use of the machine as at present constructed that the paper after the cut remains between the blades, requiring force to extricate it, often becoming torn and thereby clogging the blades, the advantages of our invention which entirely obviates this objection, are self apparent.

We do not claim to be the inventors of a motto cutter.

What we do claim as our invention and desire to secure by Letters Patent is—

The improved form of the blades by the addition of the parts which we have denominated clearing teeth to be inserted in the same as herein described for the purposes mentioned.

PETER PEUGEOT.
GEORGE PEUGEOT.

Witnesses:
F. GOWERBY,
SAML. BENNETT.